United States Patent [19]

Hamisch, Jr. et al.

[11] 3,986,449

[45] Oct. 19, 1976

[54] SELECTIVE PRINTING APPARATUS

[75] Inventors: Paul H. Hamisch, Jr., Franklin; Paul H. Hamisch, Sr., Dayton, both of Ohio

[73] Assignee: Monarch Marking Systems, Inc., Dayton, Ohio

[22] Filed: Apr. 9, 1973

[21] Appl. No.: 349,576

Related U.S. Application Data

[62] Division of Ser. No. 92,465, Nov. 24, 1970, abandoned.

[52] U.S. Cl. .......................... 101/93.04; 197/1 R; 101/109
[51] Int. Cl.² ................................... B41J 7/70
[58] Field of Search ............. 101/93 C, 90, 66, 102, 101/103; 197/1 R

[56] References Cited
UNITED STATES PATENTS

| | | | |
|---|---|---|---|
| 2,689,520 | 9/1954 | Katz | 101/103 |
| 3,112,693 | 12/1963 | Williams | 101/102 |
| 3,139,820 | 7/1964 | Kittler | 101/93 C |
| 3,221,651 | 12/1965 | Tagliasacchi | 101/183 |
| 3,242,855 | 3/1966 | Noll et al. | 101/109 |
| 3,255,693 | 6/1966 | Eissfeldt et al. | 101/93 C |
| 3,542,182 | 11/1970 | Langenberger | 101/93 C X |
| 3,712,210 | 1/1973 | Landis | 101/93 C |

Primary Examiner—Edward M. Coven
Attorney, Agent, or Firm—Joseph J. Grass

[57] ABSTRACT

There are disclosed method and apparatus for selectively printing human readable characters and a machine readable code on record members in the form of tickets, tags or labels. A disclosed method of printing relates to selective printing using one or more printing bands and coupling driving means with each band to drive each printing band a predetermined distance to a position at which the type element corresponding to the selected indicium is moved to the printing zone. This method can be carried out using one type of print head with printing bands which are automatically, individually, and selectively moved or shifted to a printing zone to print the selected indicia. Another disclosed method is used to selectively position printing members of the bar-type to print bar codes. This method can be carried out by using another type of print head which has automatically, individually, and selectively settable bar-shaped printing members and which applies a machine readable code to the record members in predetermined relationship with respect to an aligner. There are three print heads of the one type and one print head of the other type for printing in stages at different locations on the record members.

4 Claims, 23 Drawing Figures

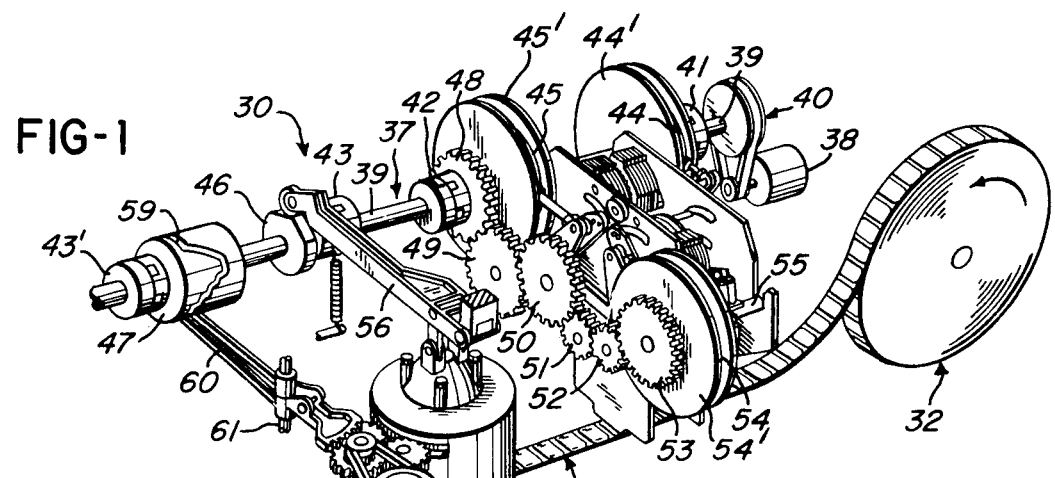
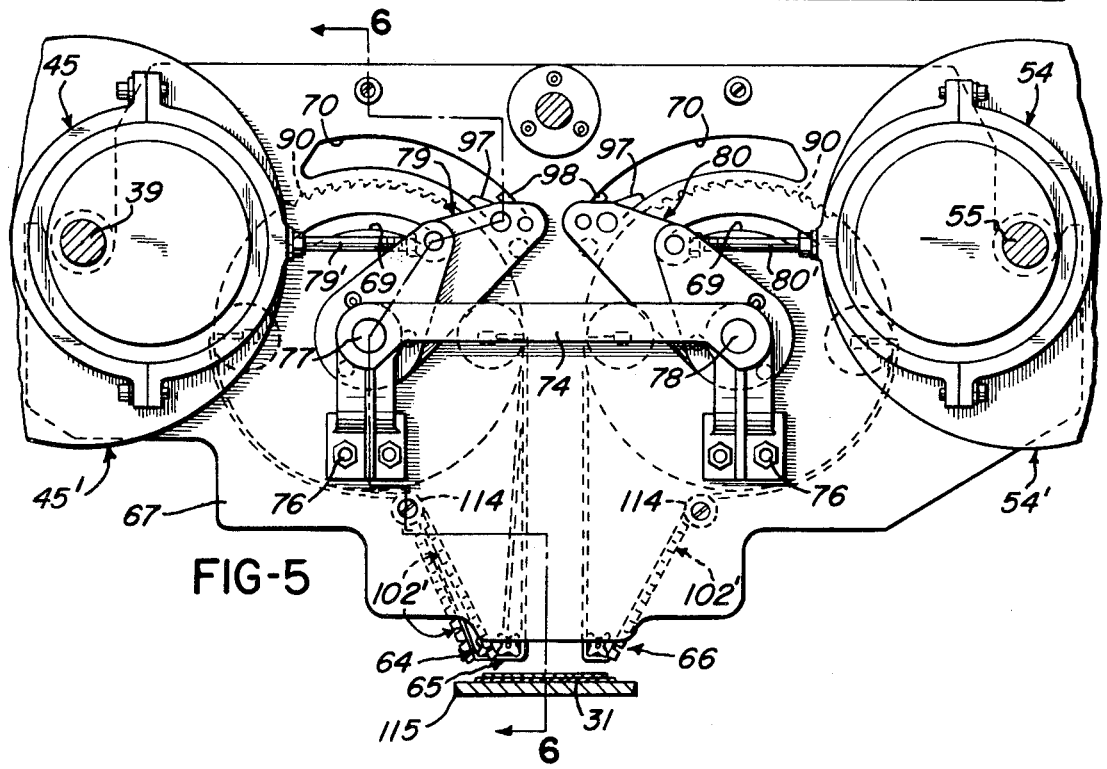

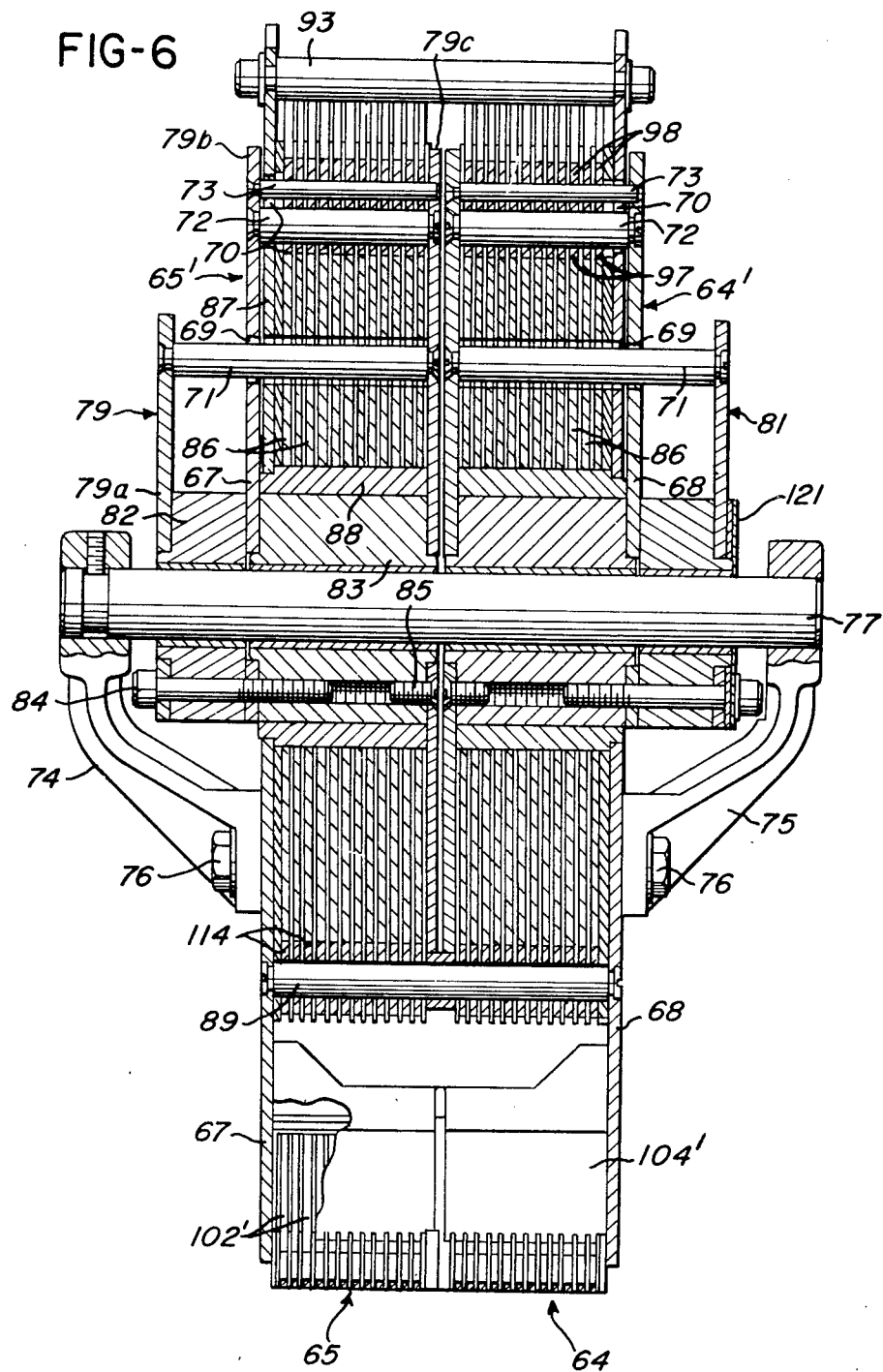

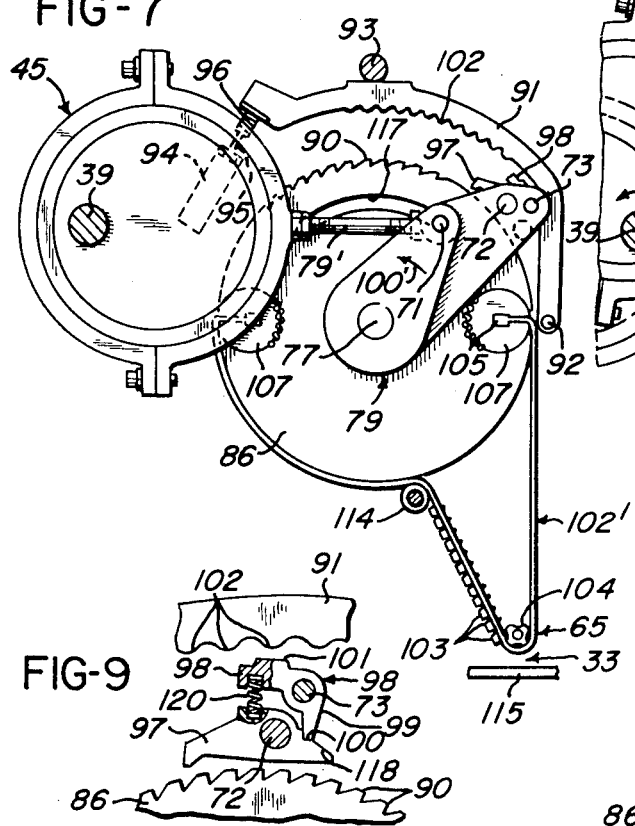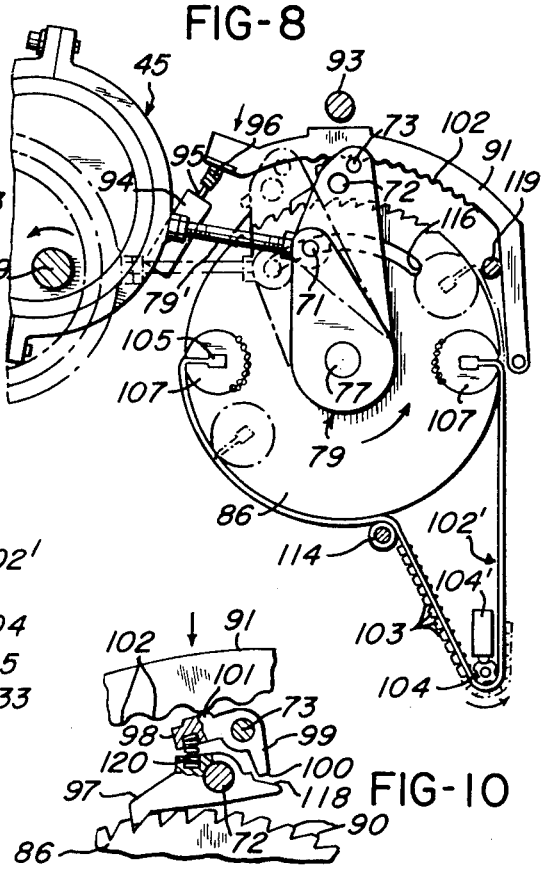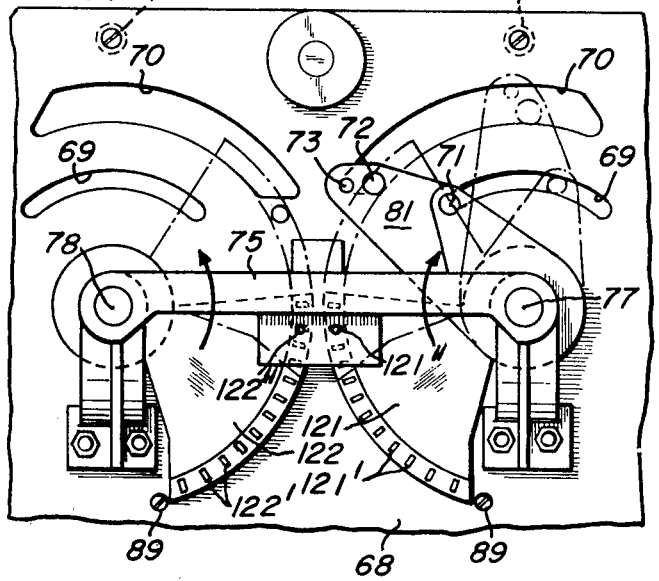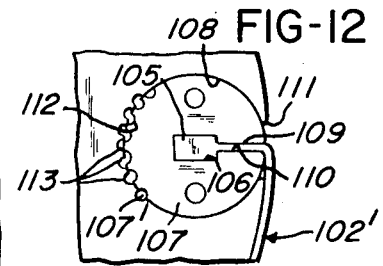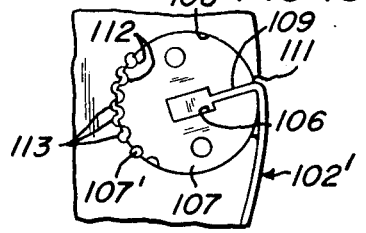

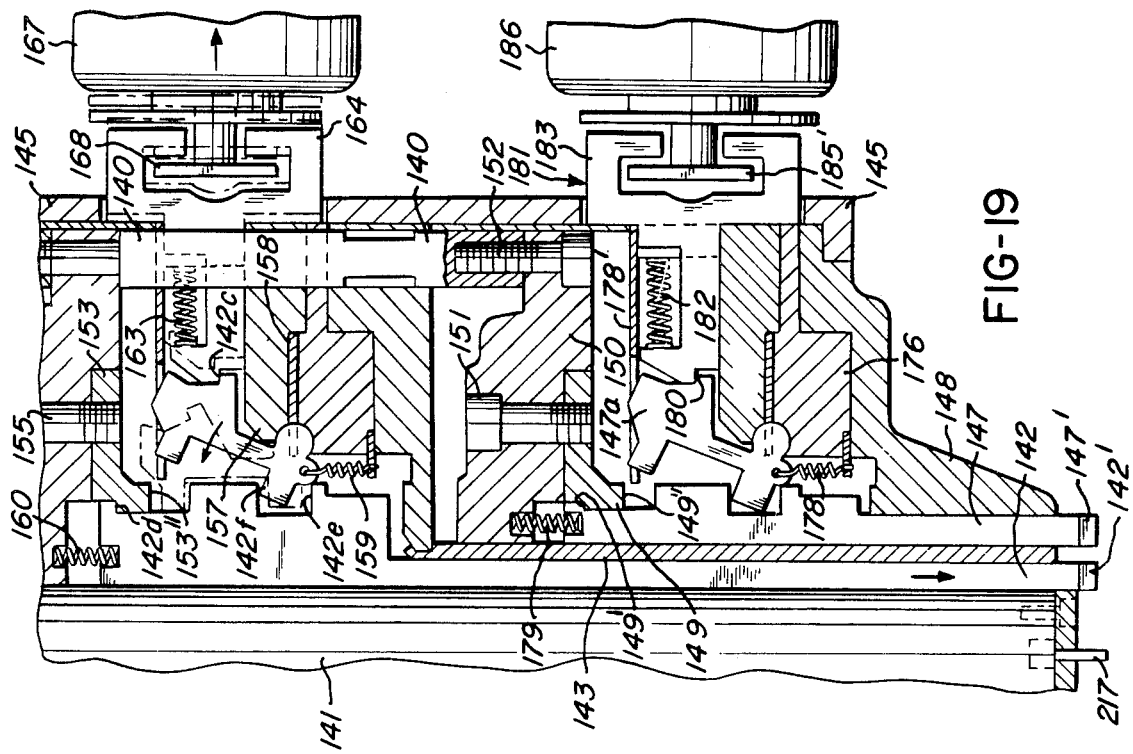
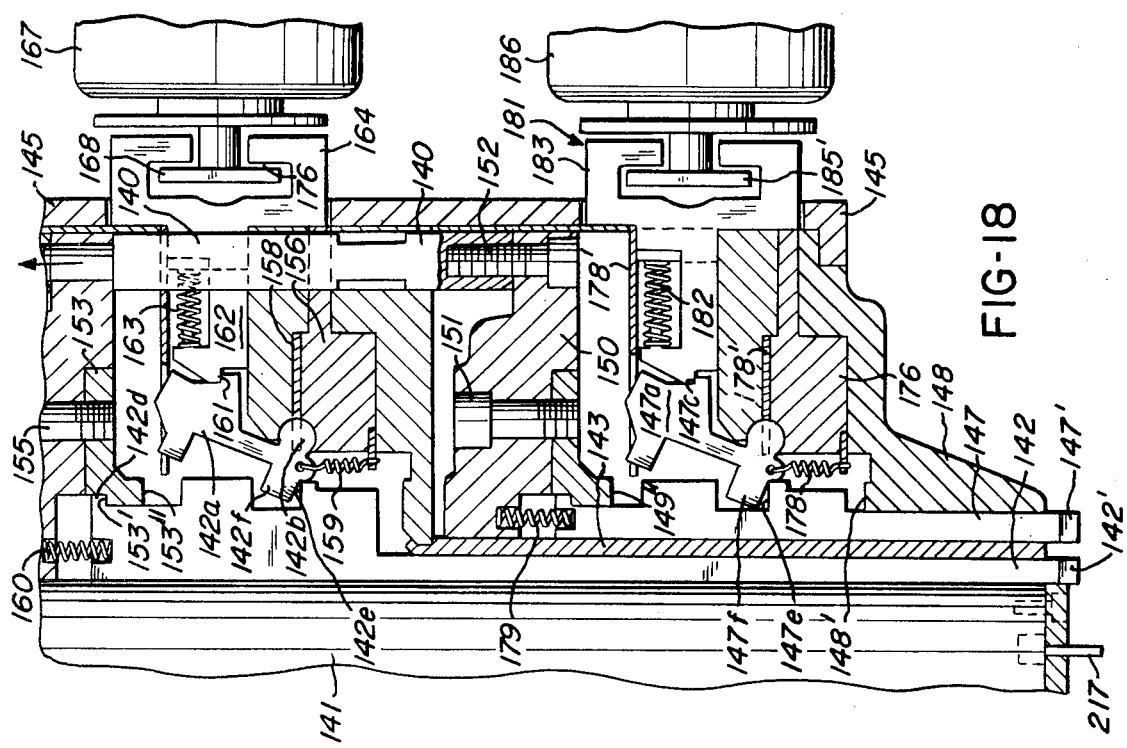

3,986,449

SELECTIVE PRINTING APPARATUS

CROSS-REFERENCE TO RELATED APPLICATIONS

This is a division of application Ser. No. 92,465 filed Nov. 24, 1970, now abandoned. Reference is also made to applications Ser. No. 92,367 filed Nov. 24, 1970 and Ser. No. 368,139, filed June 8, 1973 owned by the assignee of the present application.

FIELD OF THE INVENTION

This invention relates to the art of selective coding and printing.

SUMMARY OF THE INVENTION

The invention comprising a selecting and printing method for printing bar codes on record members in which the printing members which print the bars are automatically selected and thereafter the bars are simultaneously printed by moving a platen relatively toward the selected printing members. Specific apparatus for carrying out the method includes an interposer cooperable with each printing member, a latch individual to and cooperable with each interposer, means for setting the printing members and latching the latches, selector magnet means for selectively tripping the latch means, and platen means cooperable with the selected printing members for printing the selected bar code. A specific arrangement of the printing members is in two annular concentric rows. It is sometimes desirable to print human readable indicia on the record members in addition to the machine readable code. The human readable indicia are printed by a print head having printing bands which are selectively set automatically. There is a common drive for the selector means of both the print head and the code head.

BRIEF DESCRIPTION OF THE DRAWINGS

FIG. 1 is a perspective view of apparatus for carrying out the method of the invention including a plurality of print heads for printing human readable characters and a code head for printing a code on the record members;

FIG. 2 is a top plan view of pressure sensitive labels mounted on a backing strip showing the stages at which the printing is accomplished;

FIG. 5 is a sectional view taken along the line 5—5 of FIG. 3;

FIG. 6 is a sectional view taken generally along lone 6—6 of FIG. 5;

FIG. 7 is a fragmentary view showing the mechanism for setting the printing bands, the mechanism being in its advanced or reset position;

FIG. 8 is a view similar to FIG. 7, but showing printing bands being set to print the selected indicium;

FIG. 9 is a fragmentary elevational view showing the manner in which a pawl, a latch, a rotary ratchet driver and an operator are disposed in an ineffective position;

FIG. 10 is an elevational view similar to FIG. 9 but showing the operator as driving the latch out of the latched position and causing the pawl to engage the rotary ratchet driver;

FIG. 11 is a view of the other side of the apparatus from the side shown in FIG. 5;

FIG. 12 is a fragmentary elevational view showing the manner in which one end of the printing bands is adjustably connected to the driver, in one adjusted position;

FIG. 13 is a fragmentary elevational view similar to FIG. 12, but showing another adjusted position;

FIG. 18 is a fragmentary sectional view of the code head while in the reset mode;

FIG. 19 is a fragmentary sectional view of the code head in the set mode;

DESCRIPTION OF THE PREFERRED EMBODIMENT

Figure 3:
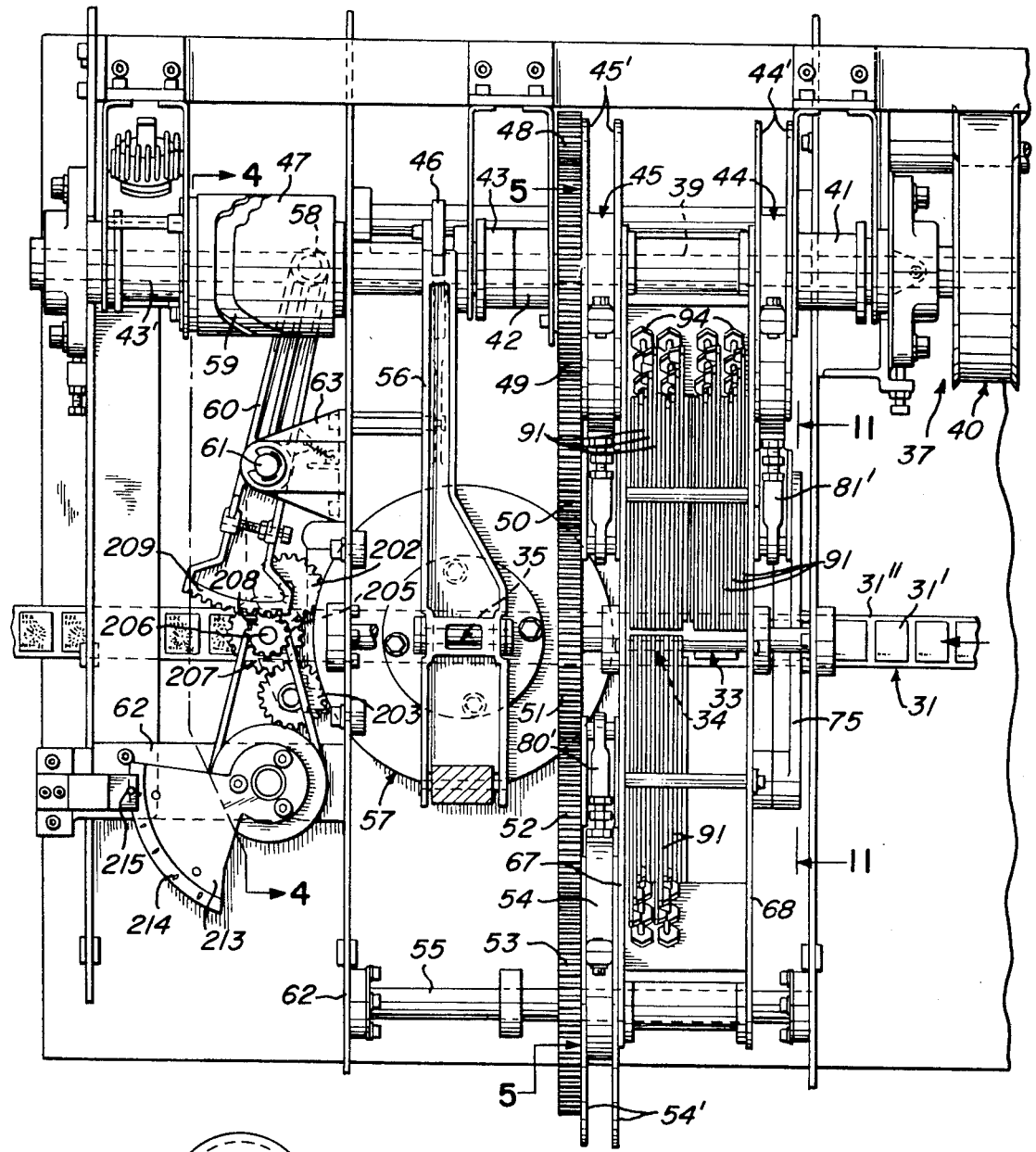
FIG. 3 is a top plan view of the apparatus shown in FIG. 1.
Figure 4:
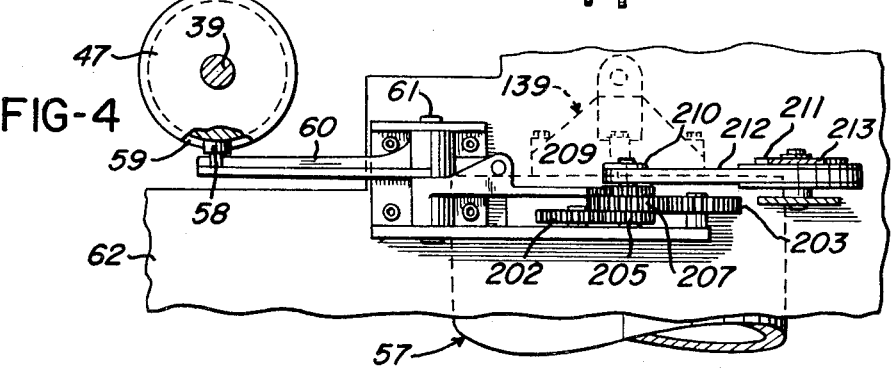
FIG. 4 is a sectional view taken along line 4—4 of FIG. 3.

Referring to FIGS. 1 and 3, there are shown fragmentary portions of a printing apparatus generally indicated at 30 for printing human readable indicia and machine readable codes on record members 31 such as tickets, tags or labels. The record members 31 are shown to be drawn off a supply roll 32 by feed means (not shown). The record members 31, in the illustrated embodiment, are shown to comprise pressure sensitive labels 31' releasably mounted on backing material in the form of an elongated web 31". The web of record members 31 is progressively passed to a first printing stage or station 33, thereafter to a second stage or station 34, and thereafter to a third stage or station 35. Printing at the stages 33, 34 and 35 is selectively accomplished in that the indicia printed at these stages can be varied and more particularly can be automatically changed in response to electronic signals from associated controls not disclosed in the subject application. Although selection is accomplished electronically, shifting of the operative mechanical elements used in printing both the human readable characters or indicia and the machine readable codes is effected by a drive mechanism generally indicated at 37 which is common to the printing mechanisms at the stages 33, 34 and 35.

With reference to FIG. 2, one data line D1 is printed on record member 31'a at stage 33, while other data lines D1 and D2 is printed on record member 31'b at stage 34, and while a code C1 is printed and an aligner hole A1 is punched on record member 31c at stage 35. The drive mechanism 37 is shown to include an electric motor 38 coupled to a drive shaft 39 by a pulley type speed reducer 40. Clutches 41, 42, 43 and 43' mounted by the shaft 39 are individually and selectively operable to drive respective eccentric 44, eccentric 45 and gear 48, a cam 46, and a cam 47. The gear 48 which is driven at the same time the eccentric 45s is driven in response to engagement of the clutch 42, drives a series of gears 49, 50, 51, 52 and 53. The gear 53 is directly coupled to an eccentric 54, both of which are rotatably mounted to a rotatable shaft 55. As the gears 48–53 to not affect any change in the gear ratio, the shafts 39 and 55 rotate at the same angular speed. The cam 46 operates a follower arm 56 which is used in progressive resetting, setting and printing modes of operation of a code head generally indicated at 57. The cam 47 is a barrel type cam in which a roller type follower 58 (FIG. 3) tracks a groove 59 in the cam 47. The roller 58 is carried by a follower arm 60 pivotally mounted by a shaft 61 which is fixed to the frame 62 by a bracket 63.

Figure 14:
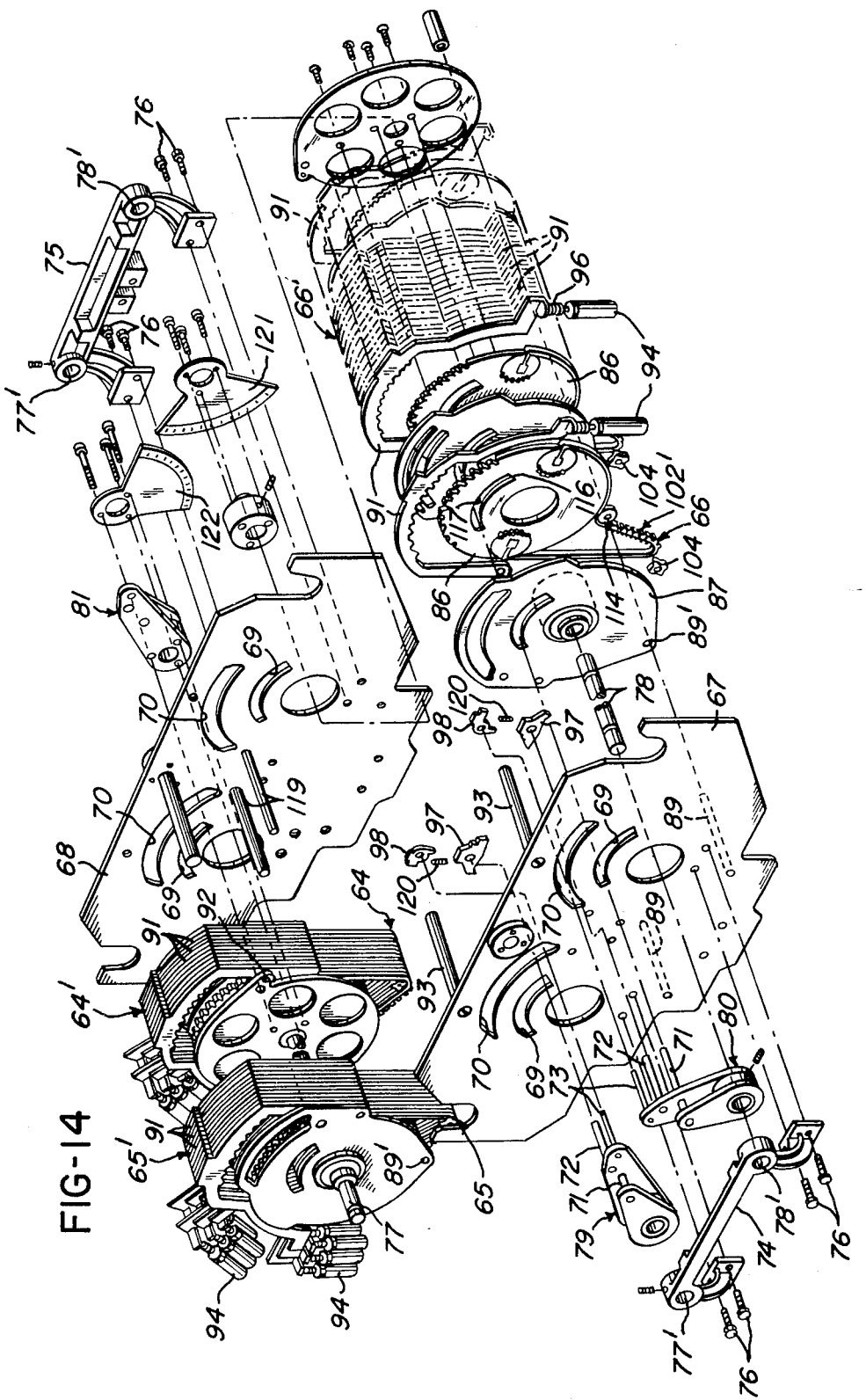
FIG. 14 is an exploded perspective view of three of the print heads shown also in FIG. 1.

With reference to FIG. 14 there is shown a fragmentary exploded perspective view of print heads 64, 65, and 66 and respective selector mechanisms 64', 65' and 66'. The selector mechanisms 64', 65' and 66' are shown to be disposed between a pair of frame plates 67 and 68 each include a pair of arcuate elongated slots 69 and 70 through which reset members or rods 71 and pawl carrying shaft 72 and latch carrying shaft 73 of the respective selector mechanisms 64', 65' and 66' extend. Opposed shaft mounting members 74 and 75 secured to respective frame plates 67 and 68 by fasteners 76 mount fixed shaft 77 and rotatable shaft 78. The shafts 77 and 78 are received is respective bores 77' and 78' in the members 74 and 75.

As there are six gears 48–53, the shafts 39 and 55 rotate in opposite directions. Consequently, eccentrics 45 and 54 drive respective selector arms 79 and 80 in opposite directions. As selector arm 81 is also mounted to the fixed shaft 77 it oscillates in the same direction as the selector arm 79 assuming respective clutches 41 and 42 are engaged. The clutches 41 and 42, as well as the clutches 43 and 43', are of the single-revolution electromagnetic type. Every time clutches 41 and 42 are engaged the respective selector arm 81 and the respective selector arms 79 and 80 rotate through predetermined angles in one direction during the resetting cycle. When the resetting cycle is complete, the continued rotation of the shaft 39 causes the arms 81, and 79 and 80 to rotate through the same angles in the opposite direction in the setting cycle. The selector arms 79, 80 and 81 are driven by respective eccentrics 45, 54, and 44. Pivotally connected to the eccentric 45 at one end and the selector arm 79 at the other end is a connecting rod 79'. Eccentric 54 is connected to its respective selector arm 80 by a connecting rod 80', and the eccentric 44 is connected to its respective selector arm 81 by a connecting rod 81' (FIG. 3). Eccentrics 44, 45 and 54 have respective guide plates 44', 45' and 54'.

As the print heads 64, 65 and 66 and the respective selector mechanisms 64', 65' and 66' are similar in construction, only the printing head 65 and its respective selector mechanism 65' will be discussed in detail. With particular reference to FIG. 6, the selector arm 79 is shown to comprise arms 79a, 79b and 79c. The selector arm 79a is secured to a hub 82 which rotates relative to the shaft 77. Shafts 72 and 73 are secured at their ends to the arms 79b and 79c, thereby securely connecting the arms 79b and 79c together. Arms 79b and 79c are mounted on a hub 83 which is suitably rotatable on the shaft 77. A machine screw 84 is shown in FIG. 6 to pass through arms 79a and 79b and the hub 82 and to be threaded into the hub 83. A machine screw 85 is shown to pass through the arm 79c and to be threaded into the hub 83. A plurality of rotary drivers 86 and spacers 87 arranged in an alternating pattern are shown to be rotatably received by a bushing 88 received about the hub 83. The spacers 87 are stationary, being secured to the frame plates 67 and 68 by through-bolts 89 which extend through respective holes 89' in the spacers 87. Each of the rotary drivers 86 has a toothed rotary ratchet segment 90 arranged about a portion of the circumference of each driver 86. There is an actuator 91 individual to and associated with each driver 86. Each actuator 91 lies in and is movable in the same plane as the associated driver 86. Each actuator 91 is pivotally mounted on a fixed pivot 92 which is common to all the actuators 91. A common eccentric stop 93 is mounted by the frame plates 67 and 68, so that the rest position of all the actuators 91 can be adjusted. Operatively connected to each actuator 91 is an electromagnetic device, in particular, a solenoid 94. In particular, each solenoid 94 has a movable armature 95 which is connected to the associated arm 91 and a compression spring 96 normally urges the associated arm 91 against the stop 93.

A plurality of pawls 97 are carried by the shaft 72 and a plurality of latches or latch members 98 are carried by the shaft 73. There is a latch 98 individual to each pawl 97 and each pawl 97 is associated with the ratchet segment 90 of the respective driver 86. Each latch 98 is normally latched to its respective pawl 97 by the end of an arm 99 of the latch member 98 being in abutment with a stop face 100 of the pawl 97.

With reference to FIGS. 7–10, assume that the eccentric 45 is starting to drive the selector arm 79 counterclockwise. All the pawls 97 carried by the selector arm 79 will move in an arc over the respective ratchet segments 90. of the respective rotary drivers 86. Considering first the operation of only one driver 86, the associated actuator 91, the pawl 97 and the latch 98, assume that the selector arm 79 is rotating counterclockwise in the direction of arrow 100'. When the selector arm 79 has rotated through the proper angle as determined by the electronic controls (not shown), associated solenoid 94 is energized thereby only momentarily pivoting the actuator 91 counterclockwise against the force of the spring 96 and tripping the latch 98 which is moved from the position shown in FIG. 9 to the position shown in FIG. 10. Thereupon, a leading edge 101 of the latch 98 engages appropriate cam 102 of the actuator 91. The cam 102 is so located with respect to the ratchet segment 90 that when the solenoid 94 is energized the pawl 97 will engage with the proper tooth of the ratchet segment 90 as shown in FIG. 10. The arc through which the actuator arm 79 rotates is dependent upon the amount of eccentricity of the eccentric 45. As soon as the pawl 97 engages the proper tooth of the ratchet segment 90 rotation of the rotary driver 86 commences. The arm 79 and the pawl 97 will continue to rotate until the eccentric 45 comes to the limit of its travel which is 360° from its starting point which is illustrated by the phantom line portion in FIG. 8; in this position the shaft 39 has rotated through 180°, and now the selection operation is complete.

Associated with the driver 86 is an elongated flexible printing band 102' having a plurality of integral type elements or members 103. Rotation of the driver 86 will cause the printing band 102 to shift across an idler support roller 104 so that a selected one of the type elements or members 103 will be brought to the printing zone or station 33. Thus the angle through which the driver 86 rotates determines the distance through which the printing band 102' is shifted across the support 104.

Each printing band has an enlarged lug 105 at each end which is received in an enlarged recess 106 in an adjustable member 107. Each adjustable member 107 is received in a socket 108 of the wheel 86. A portion 109 of the printing band 102' passes through a narrow slot 110 in the adjustable member 107. with the lug 105 received in the enlarged recess 106 the band 102 can pass through opening 111 provided at the periphery of the driver 86 and at the end of the socket 108. Along a portion of the circumference of the adjustable member 107 there are equally radially spaced-apart semi-circular recesses 112. There are adjacent equally radially spaced-apart semi-circular recesses 113 in the socket 108. The recesses 112 are radially spaced apart at greater angles than the recesses 113, thereby providing a vernier setting between each adjustable member 107 and its respective socket 108. When the adjustment has been made a split pin 107' is driven into the space defined by the two recesses 112 and 113 which are aligned with each other. FIGS. 12 and 13 show the member disposed in different rotational positions in socket 108. When the printing band 102' is driven through a predetermined distance by its respective pawl 97 it will bring the selected type element 103 precisely to the printing zone 33 and yet, printing band 102' is held under the proper tension at all times. As shown in FIGS. 7, 8 and 14, the printing band 102' is passed around a roller 114 adjacent the respective ratches wheel 86. As best shown in FIGS. 6 and 14, the print head 65, provided with a plurality of printing bands 102', is moved the desired distance over its support 104 to bring the respective printing element 103 to the printing zone 33. Following the setting of the printing bands 102', and the setting of the code head 57 described in further detail hereinafter a platen 115 raises the record members 31' into printing contact with printing elements 103 to print the selected indicia. Following movement of the platen 115 away from the printing elements 103, during the next cycle of operation the clutch 42 associated with the print heads 79 (and 80) is again operated, thereupon driving the selector arm 79 clockwise (FIG. 7). During this clockwise movement, the reset rod 71 will contact end 116 of the slot 117 of each driver 86 which has been advanced out of its reset position, thereby returning each of the drivers 86 to its reset position. At the end of the reset cycle, a cam portion 118 of the pawl 97 contacts a stop 119 thereby pivoting each pawl 97 clockwise, thereby compressing spring 120 and latching the latch member 98 in the position shown in FIG. 9.

With reference to FIG. 11, a pair of timing disks 121 and 122 are secured respectively to arm 81 and shaft 78. As the shaft 78 and the arm 81 rotate in response to engagement of clutches 41 and 42, marks 121' and 122' on the timing disks 121 and 122 can be sensed by respective sensors 121'' and 122''. For every mark 121' and 122' there is a corresponding tooth on the ratchet segment 90 and a corresponding printing element 103 on the printing band 102' so that the respective solenoid 94 will be operated only when the timing disks 121 and 122 and consequently the pawls 97 are at the proper position with respect to the driver 86.

It is apparent that in order to print the data lines D1 and D2 on the record members 31', in transversely spaced apart relationship as shown in FIG. 2, that the idler support rollers must be slightly offset from each other in the transverse direction. This is indicated in FIG. 5 in which the print heads 65 and 66 are shown substantially entirely hidden behind frame plate 67, and printing band 102' of print head 64 is indicated behind print head 65.

Figure 17:
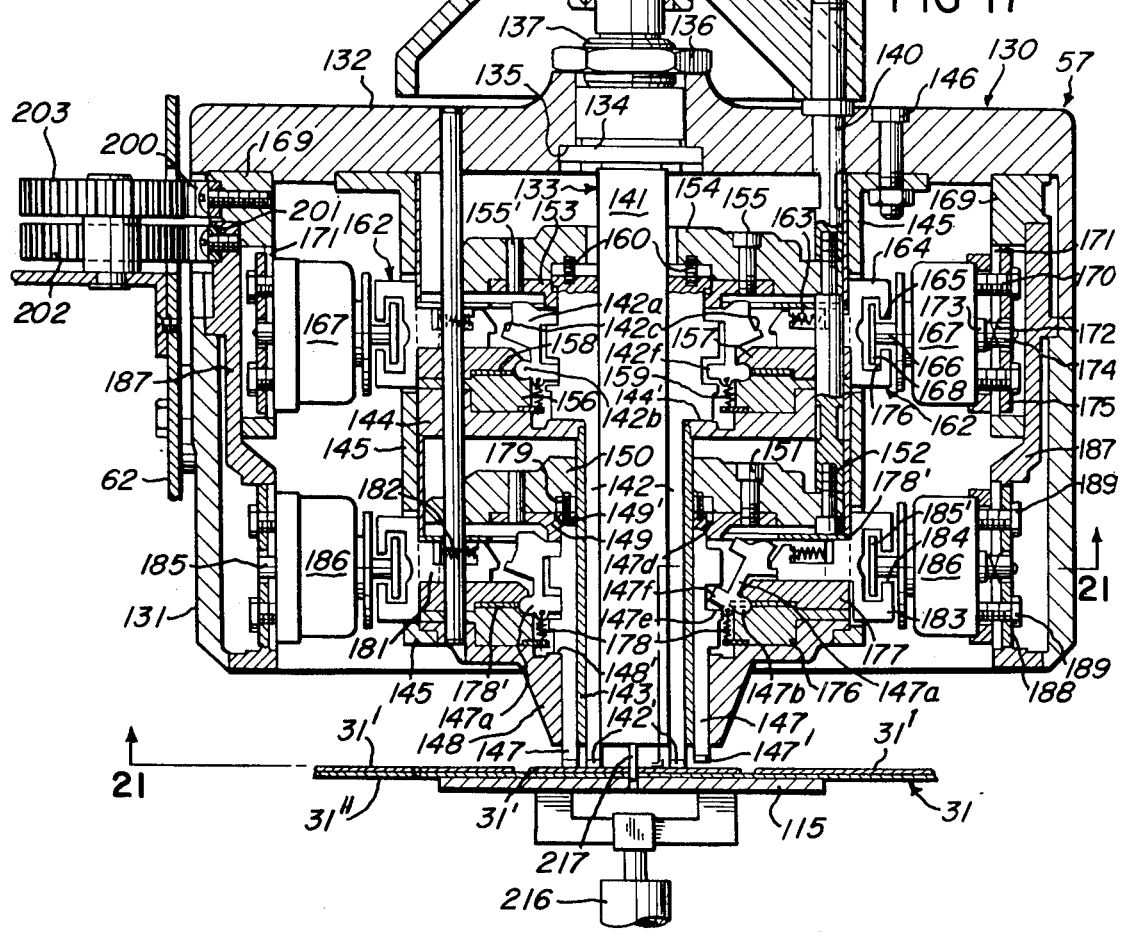
FIG. 17 is a sectional view through the code head while in the printing mode.
Figure 20:
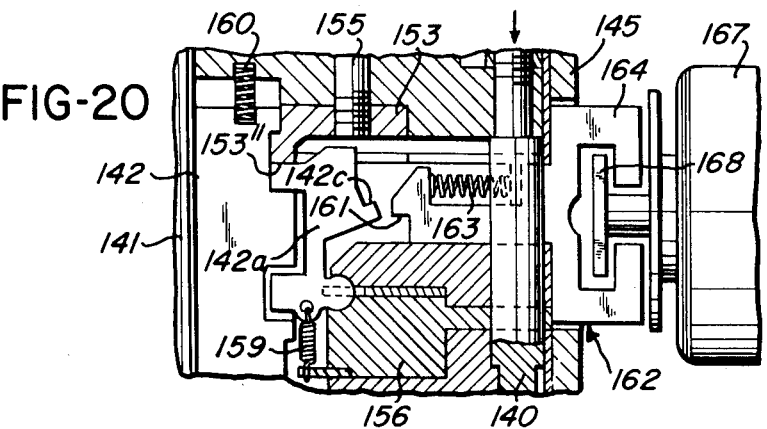
FIG. 20 is a fragmentary sectional view of the code head which is similar to FIG. 18 showing one set of components in the print mode.

With reference to FIG. 17 the code head 57 is shown to include a stationary housing 130 rigidly mounted to the frame 62. The housing 130 has an annular side wall 131 and an end wall 132 joined to it. A central guide generally indicated at 133 has a flange 134 drawn against the shoulder 135 when a nut 136, threadably received by a threaded position 137, is tightened. The upper end of the central guide 133 comprises an upper guide portion 138 about which a member 139 is slidably received. Four control rods 140, only one of which is shown in FIG. 17 extend into the interior of the housing 130 and are operative to move the components of the code head 57 into the reset, the set and the print modes.

Figure 23:
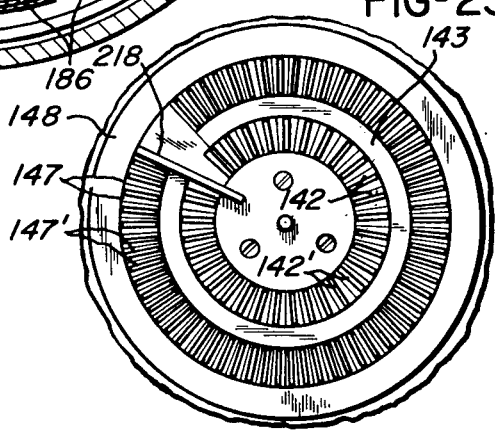
FIG. 23 is a bottom plan view showing the printing members of the code head.

The lower guide portion 141 of the central guide 133 serves to locate and guide the shanks of the printing members 142 which are disposed in an inner annular row. The printing members 142 have bar-shaped print faces 142'. As best shown in FIG. 23 the shanks of the printing members 142 are trapezoidal in section so that a particular printing member 142 is guided partly by the two next adjacent printing members 142. The printing members 142 are also guided by an outer guide 143 in the form of an annular tube. The guide 143 is secured at its upper end to an annular member 144 which is secured to another annular member 145. The annular member 145 is bolted to the end wall 132 by a plurality of bolts 146, only one of which is shown in FIG. 17. An outer annular row of printing members 147 is guided partly by the outer surface of the outer guide 143, and partly by a guide 148 which encircles the printing members 147 and which is held in place by the annular member 145. The shank of each printing member 147 is also guided partly by an annular member 149 and an annular member 150. The annular members 149 and 150 are secured to each other by machine screws 151. The annular member 150 is secured to the lower ends of the control rods 140 by machine screws 152. Similarly, an annular member 153 and an annular member 154 secured to each other by a plurality of machine screws 155 and pins 155' serve to guide the upper ends of the printing members 142. The annular member 154 is secured to the control rods 140.

Figure 21:
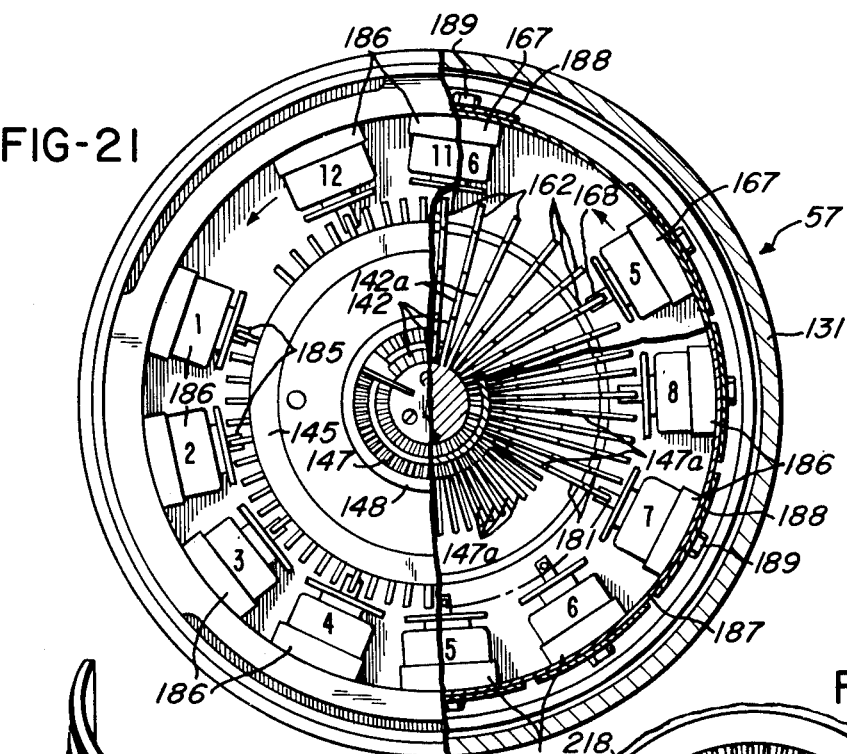
FIG. 21 is a bottom plan view of the code head with various parts broken away for clarity.
Figure 22:
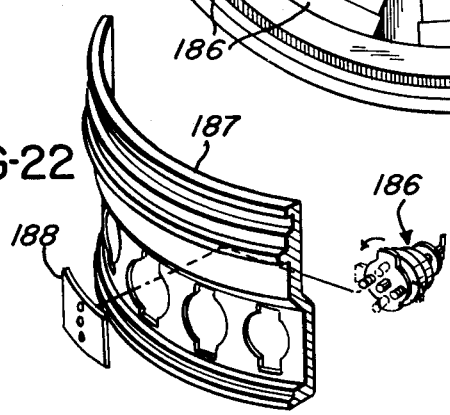
FIG. 22 is an exploded fragmentary perspective view of one of the selector rings and a solenoid.

An interposer 142a is individual to each printing member 142. The interposers 142a are disposed in an annular ring or row as best indicated in FIG. 21. Each interposer 142a has a generally circular extension 142b which is received in a socket formed in part by an annular member 156 and an annular member 157. A slotted disk 158 sandwiched between members 156 and 157 serves to guide the interposers 142a during their pivotal movements and to maintain the interposers in their positions in planes which extend through the centerline of the central guide 133. The circular extension 142b of each interposer is received in one of the open ended slots of the disk 158. Each interposer 142a is urged toward its respective printing member 142 by a tension spring 159. A compression spring 160 individual to each printing member 142 urges that respective printing member 142 downwardly (FIG. 17). Each interposer 142a has a latching shoulder 142c which is adapted to be engaged by a latching shoulder 161 of a respective latch 162. There is a latch 162 individual to each interposer 142a. Each of the latches 162 is urged toward its respective interposer 142a by a compression spring 163, one end of which abuts member 157 and the other end of which abuts its respective latch 162. Both of the interposers 142a shown in FIG. 17 are in their effective interposing positions, each of the respective latches 162 having been tripped.

Each latch 162 has a generally C-shaped portion 164 with an opening 165 which can receive an extension 166 of a solenoid 167. The extension 166 is connected to a lug 168 which can fit into the C-shaped portion 164. The solenoid 167 is bolted to a rotatable annular cage 169 by a pair of threaded fasteners 170 at openings 171. A compression spring 172 which abuts a shoulder 173 of another extension 174 of the armature of each solenoid 167 and a plate 175 normally urges the extension 166 and the lug 168 into the position shown in FIG. 17. When energized, the solenoid 167 is operative to drive the lug 168 against faces 176 of the C-shaped portion 174 thereby causing the respective latch 162 to move out of latching cooperation with the associated interposer 142a.

In the illustrated embodiment of the code band 57, there are thirty printing members 142, thirty interposers 142a, thirty latches 162 and six solenoids 167. The cage 169 which mounts the six solenoids 167 can rotate relative to the housing 130 so that the six solenoids 167 are first in operative relationship with respect to the C-shaped portions 164 of the first six latches. The selected solenoids 167 which are energized while in this rotational position will cause the respective latches 162 to move to their ineffective positions thereby causing the respective interposers 142 to pivot into their effective positions as shown in FIG. 17. The solenoid or solenoids 167 which are not operated will not affect the latch position of the respective interposer member or members 142a. Selection of one of the first six printing members 142 is complete. The cage 149 is now rotated through a small angle until the lug 168 of each of the solenoids 167 is in operative relationship with respect to the C-shaped portions 164 of the second six interposers 162. Again, depending upon which of the solenoids 167 are operated will determine which of the latches 162 are moved to its ineffective positions thereby permitting the respective interposers 142a to move to their effective positions. The cage 162 is moved through three more successive steps until the selection operation has been completed for the third, fourth, and fifth sets of printing members 142.

An interposer 147a is individual to each printing member 147. The interposers 147a are disposed in an annular ring or row as best indicated in FIG. 21. Each interposer 147a has a generally circular extension 147b which is received in a socket formed in part by an annular member 176 and an annular member 177. Spaced apart slotted disks 178' guide the interposers 147a during their pivotal movements and maintain the interposers 147a in their positions in planes which extend through the centerline of the guide 133. Each interposer 147a is urged toward its respective printing member 147 by a tension spring 178. A compression spring 179 individual to each printing member 147 urges the respective printing member 147 downwardly (FIG. 17). Each interposer 147a has a latching shoulder 147c which is adapted to be engaged by a latching shoulder 180 of a respective latch 181. Each of the latches 181 is urged toward its respective interposer 147a by a compression spring 182, one end of which abuts member 177 and the other end of which abuts its respective latch 181. The interposer 147a on the right side of FIG. 17 is shown in its ineffective latched position and the interposer 147a on the left side of FIG. 17 is shown in its effective unlatch position. Each latch 181 has a generally C-shaped portion 183 with an opening 184 to receive an extension 185 of a solenoid 186. Each solenoid 186 is mounted to a movable selector 187 by means of a plate 188 and fasteners 189.

In the illustrated embodiment of the code head 57 there are sixty printing members 147, 60 interposers 147a, 60 latches 181 and 12 solenoids 186. The selector cage 187 which mounts the 12 solenoids 186 can rotate relative to the housing 130. At the start of the selection operation the 12 solenoids 186 are in operative relationship with respect to those C-shaped portions 183 of only the first 12 latches 181. The solenoids 186 which are energized while in this position will cause the respective latches 181 to move to their ineffective positions, thereby causing the respective interposers 147a to move to their effective positions. The solenoid or solenoids 186 which are not operated will not cause the respective latches 181 to be tripped and consequently the respective interposers 147a will not be moved out of their ineffective positions. Selection of one or more of the first twelve printing members 147 is now complete. The cage 187 is stepped through a small angle until the lug 185' associated with each of the solenoids 186 is in operative relationship with respect to the C-shaped portions 183 of only the second 12 latches 181. Again, depending upon which of the solenoids 186 is now operated will determine which of the latches 181 is moved to its ineffective position thereby permitting the respective interposer 147a to move to its effective position. Selection of one or more of the second 12 printing members 147 is now complete. The cage 187 is moved through three successive steps until the selection operation has been completed for the third, fourth, and fifth sets of printing members 147.

Figure 15:
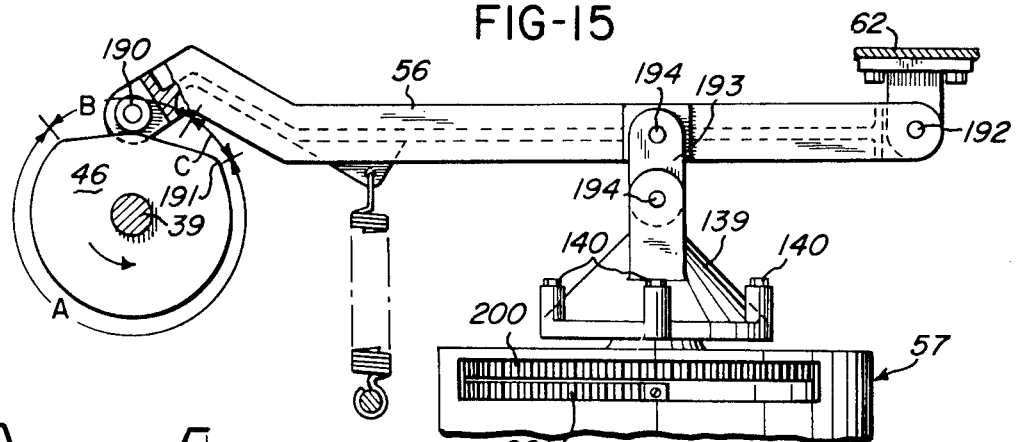
FIG. 15 is a fragmentary elevational view showing means for conditioning the printing members of the code head in reset, the set, and the print modes.
Figure 16:
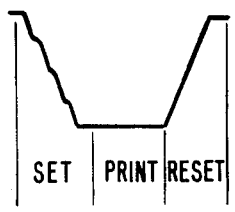
FIG. 16 is a graph showing the relationship of the cam for conditioning the code head and the cam for setting the select or solenoids at different operative positions with respect to latches in the code head.

The code head 57 operates in the reset, the set, and the print modes each time it is desired to print a different code. During the reset mode, the member 139 (FIG. 15) is driven on portion C of the cam 46 to its uppermost position as roller 190 carried by follower arm 56 approaches high point 191. The arm 56 is pivotally mounted to the frame 62 by a pivot pin 192, and the member 139 is connected to the arm 56 by a link 193 and pins 194. Upward movement of the member 139 (FIG. 17) will cause the four control rods 140 to raise the set of annular members 153 and 154 and the set of annular members 149 and 150. Specifically, shoulder 153' on the member 153 will engage shoulders 142d of printing members 142 thereby raising all the printing members 142 against the forces of gravity and springs 159 and 160. Similarly, shoulder 149' of the member 149 will engage shoulders 147d of the printing members 147 thereby raising all the printing members 147 against the forces of gravity and springs 178 and 179. As the printing members 142 and 147 are raised, shoulders 142e and 147e will will engage respective extensions 142f and 147f, thereby causing interposers 142a and 147a to pivot into the latched position in the reset mode illustrated in FIG. 18. Continued rotation of the cam 46 will cause the roller 190 to travel on portion A of the cam 46 during which selection by the solenoids 167 and 186 takes place, this being known as the set mode illustrated in FIG. 19. In the set mode there is a gap between shoulders 153'' and those interposers 142a and there is a gap between the shoulders 149'' and those interposers 147a which are in their effective interposing positions. As the cam 46 continues to rotate, the roller 190 starts traveling on section B of the cam 46 thereby lowering the member 139 and its control rods 140. Consequently the shoulders 153'' and 149'' engage all the interposers 142a and 147a which are in their effective interposing positions thereby permitting springs 160 and 179 to drive all the respective printing members 142 and 147 which have been selected against an annular stop shoulder 144' and 148' of annular member 148. The selected printing members 142 and 147 are locking in the printing position by the respective interposers 142a and 147a during the print mode. Those printing members which were not selected are held in the non-printing position by the extension 142f and 147f as indicated in FIG. 17 of the drawing.

A gear segment 200 is secured to the outside of the selector cage 169 and a gear segment 201 is secured to the outside of the selector cage 187. As there are half as many sets of printing member 142, interposers 142a, latches 162 and solenoids 167 as there are printing members 147, interposers 147a, latches 181 and solenoids 186, the cage 169 must rotate through twice the angle that the cage 187 rotates during each step. With reference to FIGS. 3 and 17, the gear segment 200 is engaged by a gear 203 and the gear segment 201 is engaged by a gear 202. The gear 202 is driven by a pinion 205 secured to a shaft 206. A gear 208 secured to the shaft 206 is driven by a gear segment 209 disposed at one end of follower arm 60. The gears 205 and 202, and the gears 207 and 203, are sized so that the gear 203 drives the cage 169 through twice the angle that gear 202 drives the cage 187. The gear 208 secured to the shaft 206 is driven by a gear segment 209 disposed at one end of follower arm 60. A pulley 210 secured to the shaft 206 drives a pulley 211 through a belt 212. A timing sector 213 has timing marks 214 readable by a stationary reader 215. The reader 215 will generate a signal each time one of the five timing marks 214 is read to provide a signal to the electronic controls. Accordingly selection of the first set of printing members 142 and 147 as described above can occur only if the first timing mark 214 is in the read position, which occurs only when the lugs 168 and 185' are in alignment with and operatively disposed relative to the first set of respective six lstches 162 and respective twelve latches 181.

Printing at stages 33, 34 and 35 is accomplished simultaneously by moving the platen 115 relatively toward the print heads 64, 65 and 66 and toward the code head 57 simultaneously. In particular, in the illustrated embodiment, the print heads 64, 65 and 66 and the code head 57 are stationary during the printing operation but the platen is moved into printing cooperation with them by any suitable means such as a piston cylinder mechanism 216 (FIG. 17). A punch 217 for forming aligner A1 in the record members 31 and a stationary printing member 218 for printing a start mark S1 are mounted at the end of the guide 133. Each time a bar code C1 is printed, the aligner A1 will be formed in the record member 31' and the start mark S1 will be printed on the record member.

Other embodiments and modifications of this invention will suggest themselves to those skilled in the art, and all such of these as come within the spirit of this invention are included within its scope as best defined by the appended claims.

We claim:

1. Apparatus for printing codes, comprising: a plurality of printing members and means for selectively operating said printing members; including a cylindrical central guide, a cylindrical tubular guide disposed about said central guide, the printing members having shanks of trapezoidal section and being in abutting relation to each other, the shanks of an inner circular row of printing members being guided between said central and said tubular guides, the shanks of an outer circular row of printing members being guided in part by said tubular guide member, a pivotally mounted interposer cooperable with each printing member, a spring for urging each interposer into its effective position with respect to its printing member, a slidably mounted latch cooperable with each respective interposer selectively to hold the interposer in its ineffective position and to release the interposer when actuated, each printing member and its respective interposer and latch constituting an operable set and a plurality of sets constituting a group, electromagnetic operator means individual to each group, means for moving each electromagnetic operator means successively into operative relationship with the latches of its respective group, the operator means being capable of tripping the latches, when a latch is tripped the respective interposer is moved from its ineffective latched position to its effective unlatched position, and a driver movable between three positions, a first position comprising a reset position in which all said interposers are moved to their ineffective positions and all said latches are latched, a second position in which the operator means causes selected ones of said latches to move into their effective positions, and a third position in which all the selected interposers have caused respective printing members to move to their printing positions.

2. Apparatus for printing codes, comprising: a plurality of printing members, an interposer cooperable with each respective printing member, spring means for urging each interposer into its effective position with respect to its printing member, a latch cooperable with each respective interposer selectively to hold the interposer in its ineffective position and to release the interposer when tripped, each printing member and its respective interposer and latch constituting an operable set and a plurality of sets constituting a group, electromagnetic operator means individual to each group for tripping the latches so that when a latch is tripped the respective interposer is moved from its ineffective latched position to its effective unlatched position, means for moving said electromagnetic operator means successively into operative relationship with the latches of its respective group, and driver means cooperable with the interposers and movable between three positions comprising a first position constituting a reset position in which all said interposers are moved to their ineffective positions and all said latches are latched, a second position in which the operator means causes selected ones of said latches to move into their ineffective positions, and a third position in which all the selected interposers have caused respective printing members to move to their printing positions.

3. Apparatus for printing codes, comprising; a plurality of printing members, an interposer cooperable with each respective printing member, spring means for urging each interposer into its effective position with respect to its printing member, a latch cooperable with each respective interposer selectively to hold the interposer in its ineffective position and to release the interposer when tripped, each printing member and its respective interposer and latch constituting an operable set and a plurality of sets constituting a group, there being a plurality of groups, electromagnetic operator means individual to each respective group for tripping the latches so that when a latch is tripped the respective interposer is moved from its ineffective latched position to its effective unlatched position, means for moving said electromagnetic operator means successively into operative relationship with the latches of their respective groups, the operator means being capable of tripping the latches, and driver means cooperable with the interposers and movable between three positions comprising a first position consituting a reset position in which all said interposers are moved to their ineffective positions and all said latches are latched, a second position in which the operator means causes selected ones of said latches to move into their effective positions, and a third position in which all the selected interposers have caused respective printing members to move to their printing positions.

4. Apparatus for printing codes, comprising: a plurality of printing members, an interposer cooperable with each respective printing member, a latch cooperable with each respective interposer selectively to hold the interposer in its ineffective position and to release the interposer when tripped, each printing member and its respective interposer and latch constituting an operable set and a plurality of sets constituting a group, electromagnetic operator means individual to each group for tripping the latches so that when a latch is tripped the respective interposer is moved from its ineffective latched position to its effective unlatched position, means for moving said electromagnetic operator means successively into operative relationship with the latches of its respective group, the operator means being capable of tripping the latches, and driver means cooperable with the interposers and movable between three positions comprising a first position constituting a reset position in which all said interposers are moved to their ineffective positions and all said latches are latched, a second position in which the operator means causes selected ones of said latches to move into their effective positions, and a third position in which all the selected interposers have caused respective printing members to move to their printing positions.

* * * * *